March 1, 1966 E. J. HAYES ETAL 3,237,526
SPRING-ASSISTED FLUID PRESSURE MOTOR MECHANISM
Filed Jan. 17, 1964 2 Sheets-Sheet 1
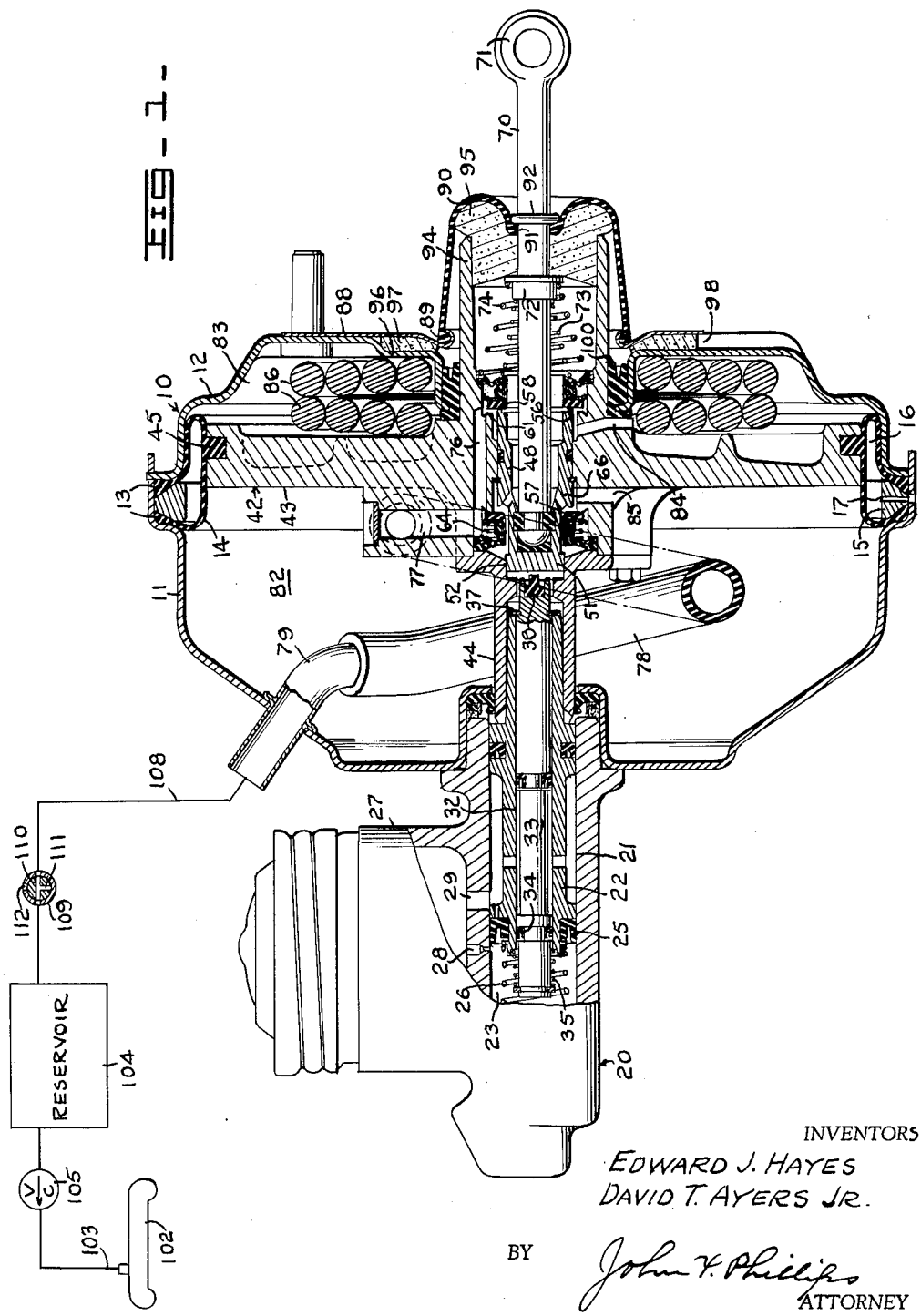
FIG-1-
INVENTORS
EDWARD J. HAYES
DAVID T. AYERS JR.
BY John F. Phillips
ATTORNEY

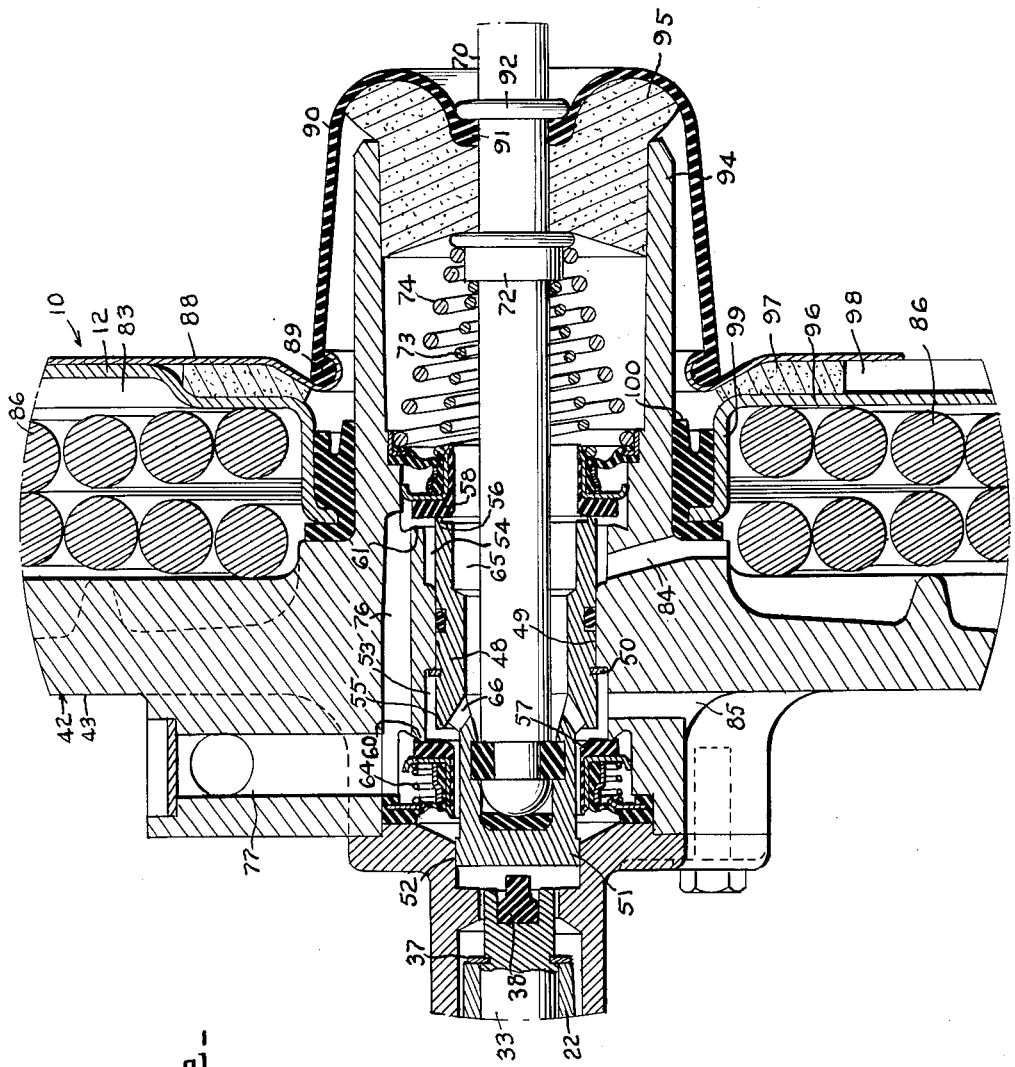

United States Patent Office 3,237,526
Patented Mar. 1, 1966

3,237,526
SPRING-ASSISTED FLUID PRESSURE MOTOR
MECHANISM
Edward J. Hayes, Livonia, and David T. Ayers, Jr., Birmingham, Mich., assignors to Kelsey-Hayes Company, Romulus, Mich., a corporation of Delaware
Filed Jan. 17, 1964, Ser. No. 338,389
16 Claims. (Cl. 91—376)

This invention relates to a spring-assisted fluid pressure motor mechanism, and more particularly to such a motor mechanism for use as a motor vehicle brake operating motor.

It is the common practice in motor mechanisms for operating hydraulic brakes to provide a casing having a piston or other pressure responsive unit therein defining chambers in the ends of the casing in which pressures are normally balanced, a return spring being employed under normal off conditions for maintaining the motor piston and associated parts in their off positions. It necessarily follows that there is some absorption of power by the return spring when the motor is operated. While this is not a serious defect, the full differential motor pressures are not available for brake applying effort when the brake pedal is operated.

An important object of the present invention is to provide a motor mechanism wherein, instead of using a return spring of the type referred to, an assisting spring is employed in the power chamber of the motor to assist differential pressures in applying the brakes, the normal positions of the novel valve parts establishing differential pressures in the two motor chambers to hold the piston in off position against the spring when the motor is de-energized, thus not only eliminating the absorption of power by a return spring but using a spring force to assist the motor differential pressures during brake operations.

A further object is to provide a novel type of valve mechanism for the motor wherein the valve body is movable to two positions on opposite sides of a lap position, one of such two positions connecting the motor chamber adjacent the master cylinder to a higher source of pressure than the working chamber to maintain the spring compressed, the other of such two valve positions reversing pressures in the motor to provide brake applying differential pressures assisted by the spring, thus providing higher braking effects than is ordinarily obtained.

A further object is to provide a novel valve mechanism of the type referred to wherein the valve body is provided with oppositely facing valve seats selectively engageable with oppositely facing valves, the operation of the valve body from a normal position to apply the brakes resulting in a reversal of the differential pressures in the motor chambers.

A further object is to provide a motor mechanism of the character referred to wherein the assisting spring in itself is capable of providing appreciable brake application, and to provide in combination with the parts referred to a three-way control valve which may be operated when the vehicle is parked to balance pressures in the motor chambers, thus utilizing spring forces to operate all of the wheel cylinders to act as a parking brake means.

Other objects and advantages of the invention will become apparent during the course of the following description.

In the drawings we have shown one embodiment of the invention. In this showing:

FIGURE 1 is an axial sectional view through the motor and associated parts, the master cylinder being broken away and some of the elements of the system being shown diagrammatically, and FIGURE 2 is an enlarged fragmentary sectional view showing the internal parts of the motor, including the valve mechanism.

Referring to FIGURE 1, the numeral 10 designates the motor as a whole comprising casing sections 11 and 12 fixed together at their edges in any suitable manner and clamping therebetween the beads 13 of a rolling diaphragm 14. These beads are spaced apart by a ring 15. The formation of the diaphragm is such that a chamber 16 is formed therein, and this chamber is vented to the atmosphere as at 17. The diaphragm 14 will be further described below.

Fixed to the casing section 11 axially thereof is a master cylinder indicated as a whole by the numeral 20 and having a bore 21 therein in which is operative a plunger 22 movable to the left from the normal position shown in FIGURE 1 to displace fluid from a pressure chamber 23 into the wheel cylinders (not shown). The plunger 22 is sealed in the bore 21 as at 25 and is biased to off position by the usual spring 26, the left-hand end of which operates against the conventional residual pressure valve (not shown).

The master cylinder is provided with the usual reservoir 27 having the conventional compensating port 28 ahead of the seal 25, and the fluid port 29 back of the seal 25.

The plunger 22 is provided with a bore 32 in which is arranged an axial reaction plunger 33 sealed in the bore 32 as at 34 and biased to the left to its normal position by a spring 35. Near its right-hand end, the plunger 33 carries a snap ring 37 engageable with the adjacent end of the plunger 22 to limit movement of the reaction plunger toward the left. The latter plunger carries a projecting cushion 38 for a purpose to be described.

The motor is provided therein with a piston or pressure responsive unit indicated as a whole by the numeral 42. The piston 42 includes a body 43 having an attached sleeve portion 44 engaging the plunger 22 to transmit force thereto when the motor is operated. The diaphragm 14 is a part of the piston and is anchored to the body 43 by a bead 45. Within the body 43 is arranged a valve body 48 slidable in sealed engagement with a bore 49 formed in the body 43. Movement of the valve body to the right is limited by a snap ring 50. The left-hand end of the valve body 48 is formed as a head 51 slidable in a bore 52 in the sleeve 44. This head is normally slightly spaced from and engageable with the cushion 38 when the motor mechanism is operated as described below.

At opposite ends of the bore 49 are formed chambers 53 and 54. Near the ends of the respective chambers 53 and 54 the valve body is provided with oppositely facing seats 55 and 56, respectively engageable with oppositely facing resilient valves 57 and 58 which, in turn, are engageable with oppositely facing valve seats 60 and 61 formed in the body 43. The valves 57 and 58 are sealed with respect to the valve body by means which per se are now conventional, and the valve 57 is biased to normal engagement with the seat 60 by a spring 64. The interior of the valve body 48 forms an air chamber 65 normally communicating with the chamber 53 through ports 66.

A push rod 70 extends into the valve body 48 and is connected thereto as shown, to transmit force to the valve body when the motor is to be operated. The right-hand end of the push rod 70 is provided with a pivot bearing 71 for connection of the rod 70 with a brake pedal (not shown). The rod 70 carries a double-shouldered ferrule 72, the inner shoulder of which engages a spring 73, the opposite end of which is utilized for urging the valve 58 normally into engagement with the seat 56. The outer shoulder of the ferrule 72 forms a seat for a spring 74 for biasing the rod 70 to the right to its normal position shown.

With the valves in the normal positions shown, the chamber 53 communicates with the air chamber 65. This chamber is cut off from the chamber 54 by the valve seat 56, and the chamber 54 communicates through a passage 76 with a vacuum passage 77 communicating with one end of a pigtail hose 78 (FIGURE 1). The other end of this hose communicates through a fitting 79 with a source of vacuum as described below.

The motor piston divides the motor casing to form chambers 82 and 83, and it will be apparent that vacuum is normally maintained in the chamber 54. This chamber, in turn, communicates with the motor chamber 83 through a passage 84, and accordingly, vacuum is normally maintained in the chamber 83. The motor chamber 82 communicates with the chamber 53 through a passage 85, and accordingly atmospheric pressure is normally present in the motor chamber 82.

It will be noted that there is no return spring in the chamber 82 to bias the piston to its normal off position, this being accomplished by the normal differential pressures in the motor chambers 82 and 83. These differential pressures maintain compressed a relatively strong barrel spring 86 in the chamber 83. This spring forms one of the important features of the present invention, but of course may be of other types.

A thin steel or similar plate 88 is fixed against the end wall of the motor housing 12 and has its radially inner periphery shaped to receive a bead 89 formed on a boot 90, the inner periphery of which is beaded as at 91 to engage against an annular shoulder 92 on the push rod 70. An integral sleeve extension 94 on the body 43 projects into the boot 90. A resilient air cleaner body 95 is arranged in the end of the extension 94 and in boot 90 and has its inner periphery arranged between the ferrule 72 and shoulder 92. The casing section 12 has its end wall offset inwardly as at 96 to provide an annular space to receive an air cleaner 97 which communicates with the atmosphere as at 98. Radially inwardly of the offset 96, the casing section 12 extends inwardly as at 99 to house a seal 100 in which the extension 94 is slidable.

The source of vacuum for the motor is preferably the intake manifold 102 of the vehicle engine (FIGURE 1). This manifold is connected by a line 103 to a vacuum reservoir 104, and a check valve 105 is interposed in this line. The reservoir 104 is connected by a line 108 to the fitting 79, and a three-way valve 109 is interposed in the line 108. A through passage 110 normally opens the ends of the line 108 to each other, and a lateral passage 111 in the three-way valve is adapted to communicate with the fitting 79 when the three-way valve is rotated 90 degrees in a counter-clockwise direction. Under such conditions, the passage 110 is vented to the atmosphere as at 112.

*Operation*

The parts normally occupy the positions shown in the drawing, the passage 110 (FIGURE 1) being open to connect the vacuum reservoir 104 to the pigtail 78. The vacuum will be connected through passages 77 and 76 with the chamber 54, and this chamber communicates through the passage 84 with the motor chamber 83. Thus air will be exhausted from the motor chamber 83. The chamber 53 communicates with the motor chamber 82 through the passage 85, and communicates with the atmosphere through chamber 65. Accordingly, atmospheric pressure is normally present in the chamber 82. Air is supplied to the chamber 65 through air cleaners 97 and 95, as will be apparent.

Since pressures thus normally will be unbalanced in the chambers 82 and 83, the higher pressure in the chamber 82 will maintain the body 43 of the piston in its normal position, such movement being limited by the seal 100 to maintain the spring 86 compressed.

When it is desired to apply the brakes, the brake pedal (not shown) will be depressed to move the push rod 70 to the left. This operation moves the valve seat 56 to the left, the valve 58 being caused to follow such movement by the spring 73. At the same time, the valve seat 55 moves toward and into engagement with the valve 57. When each valve engages both of its seats, the valve parts will be in lap positions.

Slight further movement of the push rod 70 causes the seat 55 to move the valve 57 away from the seat 60, thus connecting the vacuum passage 77 to the chamber 53 to exhaust air from the motor chamber 82 through the passage 85. At the same time this operation occurs, additional movement of the valve seat 56 away from the valve 58 (the latter being arrested by the valve seat 61), will connect the chamber 54 to the atmospheric chamber 65. Obviously, the valve mechanism provides a follow-up action. If the push rod 70 is moved to an intermediate brake-applying position with the valve seats 56 and 60 cracked, the arresting of the movement of the push rod 70 will result in movement of the pressure-responsive unit to restore the valves to lap position, and any tendency of the pressure-responsive unit to overrun a position corresponding to the push rod 70 will result in the slight cracking of the valve seats 55 and 61.

Therefore, it will be apparent that pressures in the motor chambers 82 and 83 will be progressively reversed by the valve operation. Whereas atmospheric pressure normally exists in the chamber 82 and vacuum in the chamber 83, air will now be exhausted from the chamber 82 and air will be admitted to the chamber 83. As soon as pressure in the chamber 82 is reduced and pressure in the chamber 83 increased to the extent where the force of the spring 86 will overcome reduced differential pressures acting toward the right against the piston, the latter will start to move and the plunger 22 of the master cylinder will displace fluid from the chamber 23 to move the brake shoes toward engagement with the drums. This pressure will be increased as soon as pressure in the chamber 83 further increases. Thus it will be apparent that upon valve operation, differential pressures moving the piston 42 to the left will be assisted by the relatively heavy spring 86, thus providing more than the usual amount of force tending to generate pressure in the master cylinder chamber 23. Moreover, the force usually provided by the piston return spring is eliminated, and the total hydraulic pressures developed will exceed those developed by conventional mechanisms for a motor of given size. This permits the use of a smaller motor, if desired.

It will be apparent that initial operation of the push rod 70 will have moved the head 51 into contact with the cushion 38 of the plunger 33. The reduced projecting tip of the cushion 38 obviously cushions movement of the head 51 into engagement with the plunger 33. As pressure is built up in the master cylinder chamber 23 by operation of the motor piston, pressure will act toward the right against the master cylinder end of the plunger 33, thus exerting an axial force against the head 51. This force provides the brake pedal with reaction which will always be proportional to pressure in the master cylinder 23.

When the brake pedal is released, the spring 74 returns the valves and valve seats to their normal relative positions to exhaust air from the chamber 83 and admit atmospheric pressure to the chamber 82. The differential pressures thus provided will return the piston 42 to its normal off position.

As previously stated, the spring 86 exerts substantial force aside from the differential pressures occurring when the valve mechanism is operated. This fact is utilized for providing a parking brake operation. When the vehicle is parked, the three-way valve may be rotated to open the right-hand end of the pipeline 108 to the atmosphere through the port 112. This operation balances pressures in the motor chambers 82 and 83 at atmospheric pressure. Under such conditions, the spring 86 exerts a force on the plunger 22 to generate in the master cylinder chamber 23, and accordingly in the wheel cylinders, a sufficient pressure to prevent the vehicle from rolling. This is more effective than conventional parking brakes since a reasonable degree of breaking pressure will be applied at all four vehicle wheels.

From the foregoing it will be apparent that the present construction provides a novel arrangement which eliminates piston return springs and utilizes spring forces to assist differential pressures in generating higher braking pressures. This is accomplished not only by the spring 86, but by the novel type of valve mechanism employed. It also will be apparent that the force of the spring 86 is readily available to develop parking brake pressures in the wheel cylinders merely by turning the three-way valve 110 counterclockwise 90 degrees from the position shown in FIGURE 1.

It is to be understood that the form of the invention shown and described is to be taken as a preferred example of the same, and that various changes in the shape, size and arrangement of the parts may be made as do not depart from the spirit of the invention or the scope of the appended claims.

We claim:

1. A motor mechanism comprising a casing, a pressure responsive unit in said casing dividing it to from a first chamber and a second chamber, a follow-up valve mechanism carried by said pressure-responsive unit and having a normal position connecting said first chamber to a relatively high pressure source and connecting said second chamber to a relatively low pressure source and being operative for connecting said first chamber to said low pressure source and said second chamber to said high pressure source to operate said pressure responsive unit, and a spring in said second chamber normally overcome by relatively high pressure in said first chamber, and assisting relatively high pressure in said second chamber in applying force to said pressure responsive unit when said valve mechanism is operated.

2. A motor mechanism comprising a casing, a pressure responsive unit in said casing dividing it to form a first chamber and a second chamber, a force-transmitting member connected to said pressure responsive unit and projecting through said first chamber, a valve mechanism comprising a valve body having spaced oppositely facing valve seats, a pair of oppositely facing valve elements respectively engageable with said seats, a second pair of oppositely facing valve seats, the parts of said valve mechanism normally occupying positions connecting said first chamber to a source of relatively high pressure and connecting said second chamber to a source of relatively low pressure, and a manually operable member connected to said valve body to move it to change the engagement of said valve elements with said valve seats to connect said first chamber to said source of relatively low pressure and to connect said second chamber to said source of relatively high pressure to actuate said pressure responsive unit to operate said force-transmitting member.

3. A motor mechanism comprising a casing, a pressure responsive unit in said casing dividing it to form a first chamber and a second chamber, a force-transmitting member connected to said pressure responsive unit and projecting through said first chamber, a valve mechanism comprising a valve body having spaced oppositely facing valve seats, a pair of oppositely facing valve elements respectively engageable with said seats, a second pair of oppositely facing valve seats, the parts of said valve mechanism normally occupying positions connecting said first chamber to a source of relatively high pressure and connecting said second chamber to a source of relatively low pressure, a manually operable member connected to said valve body to move it to change the engagement of said valve elements with said valve seats to connect said first chamber to said source of relatively low pressure and to connect said second chamber to said source of relatively high pressure to actuate said pressure responsive unit to operate said force-transmitting member, and a spring in said second chamber normally overcome by higher pressure in said first chamber and assisting higher pressure in said second chamber in applying force to said force-transmitting member when said manually operable member is operated.

4. A motor mechanism comprising a casing, a pressure responsive unit in said casing dividing it to form a first chamber and a second chamber, said pressure responsive unit comprising an axially movable body having an axial bore, a valve body slidable in said bore, said axially movable body and said valve body having longitudinally spaced from each other two pairs of radially spaced annular valve seats, a spring pressed valve urged toward engagement with both seats of each pair, said axially movable body and said valve body having formed therebetween two chambers one of which is connected to a low pressure source and the other of which is connected to a high pressure source, said valve body having a normal off position in which said high pressure chamber is connected to said first motor chamber and said low pressure chamber is connected to said second motor chamber, said valve body being axially movable to reverse the connection of said high and low pressure chambers to said first and second motor chambers to actuate said pressure responsive unit.

5. A motor mechanism according to claim 4 provided with a spring in said second motor chamber normally overcome by relatively high pressure in said first motor chamber, and assisting relatively high pressure in said second motor chamber when said valve body is axially moved, to assist relatively high pressure in said second motor chamber in actuating said pressure responsive unit.

6. A motor mechanism according to claim 4 provided with a pigtail hose within said motor adapted for connection at one end with a vacuum source and having its other end connected to said low pressure chamber whereby such chamber is a vacuum chamber, said high pressure chamber being in fixed communication with the atmosphere whereby such chamber is an atmospheric chamber.

7. A motor mechanism according to claim 4 provided with a pigtail hose within said motor adapted for connection at one end with a vacuum source and having its other end connected to said low pressure chamber whereby such chamber is a vacuum chamber, said high pressure chamber being in fixed communication with the atmosphere whereby such chamber is an atmospheric chamber, and a spring in said second motor chamber normally overcome by atmospheric pressure in said first motor chamber and vacuum in said second motor chamber and operative when operation of said valve body connects said second motor chamber to said atmospheric pressure chamber and connects said vacuum chamber to said first motor chamber, to assist atmospheric pressure in said second motor chamber in actuating said pressure responsive unit.

8. A motor mechanism comprising a casing, a pressure responsive unit in said casing dividing it to form a first chamber and a second chamber, said pressure responsive unit comprising an axially movable body having an axial bore and having an axial sleeve extension projecting away from said first chamber in sealed slidable engagement with said casing, a valve body slidable in said bore, said axially movable body and said valve body having longitudinally spaced from each other two pairs of radially spaced annular valve seats, a spring pressed valve urged toward engagement with both seats of each pair, said axially movable body and said valve body having formed therebetween two chambers one of which is connected to a source of vacuum and the other of which communicates with the atmosphere through said sleeve extension, said valve body having a normal off position in which said other chamber is connected to said first motor chamber and said one chamber is connected to said second motor chamber, said valve body being axially movable to connect said one chamber to said first motor chamber and to connect said other chamber to said second motor chamber to actuate said pressure responsive unit.

9. A motor mechanism according to claim 8 provided with a spring in said second motor chamber engaging said casing and said axially movable body, said spring being compressed when said valve body is in normal position, and assisting atmospheric pressure in said second motor chamber, in actuating said pressure responsive unit when said valve body is axially moved from said normal position.

10. A motor mechanism according to claim 8 provided with a push rod projecting through said sleeve extension and said valve body and engaging the latter to move it axially from said normal position, and an annular resilient air cleaning body surrounding said push rod within said sleeve extension.

11. A motor mechanism according to claim 8 provided with a push rod projecting through said sleeve extension and said valve body and engaging the latter to move it axially from said normal position, an annular resilient air cleaning body surrounding said push rod within said sleeve extension, and a spring in said second motor chamber engaging said casing and said axially movable body and normally maintained compressed by atmospheric pressure in said first motor chamber while vacuum is present in said second motor chamber, the force of said spring being released, when said valve body is axially moved, to assist atmospheric pressure in said second motor chamber in actuating said axially movable body.

12. A motor mechanism comprising a casing, a pressure responsive unit in said casing dividing it to form a first chamber and a second chamber, a valve mechanism having a normal position connecting said first chamber to a relatively high pressure source and connecting said second chamber to a relatively low pressure source and being operative for connecting said first chamber to said low pressure source and said second chamber to said high pressure source to operate said pressure responsive unit, a spring in said second chamber normally overcome by relatively high pressure in said first chamber, and assisting relatively high pressure in said second chamber in applying force to said pressure responsive unit when said valve mechanism is operated, and manually operable means for balancing pressures in said chambers when said valve mechanism is in normal position whereby said spring transmits force to and moves said pressure responsive unit.

13. A motor mechanism comprising a casing, a pressure responsive unit in said casing dividing it to form a first chamber and a second chamber, a source of vacuum, a valve mechanism having a normal position connecting said first chamber with the atmosphere and connecting said second chamber to said source and being operative for connecting said first chamber to said source and said second chamber to the atmosphere to operate said pressure responsive unit, a spring in said second chamber normally overcome by atmospheric pressure in said first chamber when said valve mechanism is in normal position, said spring assisting atmospheric pressure in said second chamber in applying force to said pressure responsive unit when said valve mechanism is operated, and manually operable means for balancing pressures in said chambers when said valve mechanism is in normal position whereby said spring will apply force to and move said pressure responsive unit.

14. A motor mechanism according to claim 13 provided with a vacuum line connecting said valve mechanism to said source, said manually operable means comprising a three-way valve in said vacuum line for connecting said second chamber to the atmosphere.

15. A motor mechanism comprising a casing, a pressure-responsive unit in said casing dividing it to form a first chamber and a second chamber, and comprising a body portion, a force-transmitting member connected to said body portion and projecting through said first chamber, a follow-up valve mechanism comprising an axially movable valve body, two pairs of valve seats, one seat of each pair being carried by said body portion and the other seats of said pairs being carried by said valve body, a pair of valve elements respectively engageable with the valve seats of said pairs, the valve parts of said valve mechanism normally occupying positions connecting said first chamber to a source of relatively high pressure and connecting said second chamber to a source of relatively low pressure, and a manually operable member connected to said valve body to move it to change the engagement of said valve elements with said valve seats to connect said first chamber to said source of relatively low pressure and to connect said second chamber to said source of relatively high pressure to actuate said pressure-responsive unit to operate said force-transmitting member.

16. A motor mechanism according to claim 15 provided with a spring in said second chamber engaging said pressure-responsive unit and normally overcome by higher pressure in said first chamber and assisting higher pressure in said second chamber in applying force to said force-transmitting member when said manually operable member is operated.

References Cited by the Examiner

UNITED STATES PATENTS

| 1,548,394 | 8/1925 | Sumner | 303—71 |
| 1,770,193 | 7/1930 | Bragg et al. | 91—376 |
| 2,735,268 | 2/1956 | Stelzer | 91—376 |

SAMUEL LEVINE, *Primary Examiner.*

FRED E. ENGELTHALER, *Examiner.*